US012594656B2

(12) United States Patent
Lampe et al.

(10) Patent No.: US 12,594,656 B2
(45) Date of Patent: Apr. 7, 2026

(54) DRILL BIT FOR PERCUSSION DRILLING OR IMPACT DRILLING USE FOR CUTTING REINFORCING STEEL IN CONCRETE

(71) Applicant: Heller Tools GmbH, Dinklage (DE)

(72) Inventors: Rainer Lampe, Dinklage (DE); Torsten Thiel, Quakenbrueck (DE); Guido Hoff, Wetschen (DE)

(73) Assignee: Heller Tools GmbH, Dinklage (DE)

( * ) Notice: Subject to any disclaimer, the term of this patent is extended or adjusted under 35 U.S.C. 154(b) by 83 days.

(21) Appl. No.: 18/386,334

(22) Filed: Nov. 2, 2023

(65) Prior Publication Data

US 2024/0149421 A1 May 9, 2024

(30) Foreign Application Priority Data

Nov. 3, 2022 (DE) ..................... 10 2022 129 091.3

(51) Int. Cl.
*B25D 17/02* (2006.01)

(52) U.S. Cl.
CPC ........ *B25D 17/02* (2013.01); *B25D 2250/111* (2013.01)

(58) Field of Classification Search
CPC ..... B25D 17/02; B25D 2250/111; E21B 1/02; E21B 1/04; E21B 1/14; E21B 1/38
See application file for complete search history.

(56) References Cited

U.S. PATENT DOCUMENTS 1,561,975 A * 11/1925 Des Roches ............ E21B 10/36 175/417
RE23,539 E * 8/1952 Tilden .................... B28D 1/146 175/426
3,888,320 A * 6/1975 Maxwell ............... B23B 31/113 175/323
3,999,619 A * 12/1976 Watson ................... E21B 10/48 175/420.1
4,056,152 A 11/1977 Lacey
4,202,420 A * 5/1980 Peetz ...................... E21B 10/48 175/398

(Continued)

FOREIGN PATENT DOCUMENTS

CN 1617974 A * 5/2005 ........... E21B 10/485
CN 119712093 A * 3/2025 ............. B23B 51/00
DE 2735368 2/1979
DE 19810775 9/1999
DE 19942985 A1 * 3/2001 ............. E21B 10/40

(Continued)

OTHER PUBLICATIONS

WO 2013/026594 (English Translations).*
"German Search Report," for German Patent Application No. 102022129091.3 mailed Aug. 28, 2023 (8 pages).

*Primary Examiner* — Jong-Suk (James) Lee
(74) *Attorney, Agent, or Firm* — Pauly, DeVries Smith & Deffner LLC

(57) ABSTRACT

A drill bit for percussion drilling or impact drilling use for cutting reinforcing steel in concrete, wherein the drill bit has a substantially hollow-cylindrical carrier body extending along a geometric drill bit axis, wherein the carrier body has at least one chisel tooth with a substantially radially extending first chisel edge. The first chisel edge is arranged in a middle portion of the chisel tooth, in particular precisely centrally, in the circumferential direction, and the chisel tooth has a second chisel edge extending substantially tangentially to the circumferential direction of the drill bit.

19 Claims, 4 Drawing Sheets

(56) References Cited

U.S. PATENT DOCUMENTS

| | | | | | |
|---|---|---|---|---|---|
| 4,667,755 | A * | 5/1987 | Muller et al. | B23B 51/04 125/20 |
| 5,015,128 | A * | 5/1991 | Ross, Jr. | B28D 1/041 408/67 |
| 5,246,318 | A * | 9/1993 | Merrill | B23B 51/04 408/703 |
| 6,315,066 | B1 * | 11/2001 | Dennis | E21B 10/5735 408/145 |
| 6,374,931 | B1 * | 4/2002 | Nieves | E21B 10/58 175/420.1 |
| 6,786,684 | B1 * | 9/2004 | Ecker | B23B 51/04 408/207 |
| 8,960,336 | B2 * | 2/2015 | Kersten | E21B 10/445 175/398 |

FOREIGN PATENT DOCUMENTS

| | | | | |
|---|---|---|---|---|
| DE | 10053344 A1 * | 5/2002 | B23B 51/02 |
| DE | 102004050033 A1 * | 4/2006 | B23B 51/0466 |
| DE | 202009001814 | 4/2009 | |
| DE | 102011081443 A1 * | 2/2013 | B23B 51/04 |
| DE | 102011084436 A1 * | 4/2013 | B23B 51/0406 |
| DE | 102011084436 B4 * | 10/2015 | B23B 51/0406 |
| DE | 102018104460 A1 * | 8/2019 | B23B 51/0406 |
| DE | 202018106720 | 2/2020 | |
| EP | 0864723 | 9/1998 | |
| EP | 1616649 A1 * | 1/2006 | B23B 51/00 |
| EP | 3235581 A1 * | 10/2017 | B23B 51/02 |
| FR | 2601282 A1 * | 1/1988 | B23B 51/00 |
| GB | 2086278 | 5/1982 | |
| WO | WO-2013053545 A1 * | 4/2013 | B23B 51/0406 |
| WO | WO-2020193418 A1 * | 10/2020 | B23B 51/04 |

* cited by examiner

DRILL BIT FOR PERCUSSION DRILLING OR IMPACT DRILLING USE FOR CUTTING REINFORCING STEEL IN CONCRETE

CLAIM OF PRIORITY

This application claims the benefit of German Patent application No. DE 10 2022 129 091.3 filed on Nov. 3, 2022, the disclosure of which is incorporated herein by reference.

FIELD OF THE TECHNOLOGY

The disclosure relates to a drill bit for percussion drilling or impact drilling use for cutting reinforcing steel in concrete.

BACKGROUND

The known prior art (DE 198 10 775 A1) on which some embodiments are based concerns a drill bit for percussion or impact drilling use for cutting reinforcing steel in concrete. The drill bit has a shank portion and a carrier body which is attached to the shank portion and extends as a hollow cylinder along a geometric drill bit axis. The drill bit has a chisel tooth with a substantially radially extending chisel edge. The chisel edge is arranged in the front third of the chisel tooth in the circumferential direction, and defines a chisel tooth line which is arranged obliquely to the drill bit axis.

SUMMARY

Often, holes must be drilled in reinforced concrete, for example for fastening purposes. For this, firstly a hole is drilled in the concrete using a rock drill or concrete drill. If a reinforcing steel is encountered, use of a drill bit according to the proposal is required in order to cut the reinforcing steel. Cutting takes place by percussion drilling or impact drilling use of the drill bit. As soon as the reinforcing steel has been cut, drilling can continue with the rock or concrete drill previously used.

One difficulty is that cutting through the reinforcing steel takes a great deal of time. Because of the design of the chisel tooth, during percussive or impact use, a force opposite the rotational direction may be generated which counters the rotation of the drill bit, whereby the reinforcing steel is cut unevenly and the rotational movement of the drill bit is hindered.

Various embodiments are based on the problem of configuring and refining the known drill bit such that rapid and low-cost cutting of reinforcing steel in concrete is possible.

The above problem is solved by the features as described herein.

An aspect is the concept of loading the chisel tooth evenly in the radial direction and in the rotational direction when cutting reinforcing steel, so that no force or only a reduced forced against the rotational direction of the drill bit is generated. It has been found that an initial spot-loading of the chisel tooth and subsequent even loading in the axial and tangential direction allows an even and efficient cutting of reinforcing steel within a short time. In this way, it is possible to reduce the wear on the drill bit and in particular the chisel tooth, whereby a long service life of the drill bit can be achieved. Because of the even loading, less energy is required for cutting the reinforcing steel.

In detail, it is proposed that the first chisel edge is arranged in a middle portion of the chisel tooth, in particular precisely centrally, in the circumferential direction, and the chisel tooth has a second chisel edge extending substantially tangentially to the circumferential direction of the drill bit.

The configurations of some embodiments include arrangements of the first and second chisel edges so as to allow a particularly even cutting of reinforcing steel.

Various embodiments concern configurations of the angle between the chisel faces adjoining the first and second chisel edges on both sides and/or portions of the first or second chisel edge, whereby cutting of reinforcing steel can take place in a particularly short time.

According to various embodiments, a substantially continuous transition is achieved from the chisel faces to a carrier end face of the carrier body which is arranged perpendicularly to the geometric drill bit axis and relative to which the chisel tooth axially protrudes, in and against the rotational direction, whereby an even rotation of the drill bit is also possible even if a burr in the region between the carrier end face and the chisel edges meets the chisel tooth.

According to various embodiments, in the axial direction, in the region of the meeting of the two chisel edges, the chisel tooth has an overhang relative to the carrier end face of 1 mm to 4 mm, whereby a particularly efficient cutting of reinforcing steel in concrete is possible.

According to various embodiments, the chisel tooth has a transverse extent in the direction of the first chisel edge. The transverse extent is variable along the second chisel edge, wherein the greatest transverse extent is spaced from the front flank of the chisel tooth in the circumferential direction. It has been found that shifting the greatest transverse extent away from the front flank effectively prevents damage to the chisel tooth in the region of the greatest transverse extent, whereby the service life of the drill bit is extended.

According to various embodiments, the chisel tooth protrudes beyond the carrier body in the radial direction at least on one side, whereby the friction between the carrier body and the concrete may be reduced.

In various embodiments, starting from the greatest transverse extent, the transverse extent of the chisel tooth reduces towards the front flank and towards the rear flank.

According to various embodiments, in the radial direction, the chisel tooth has a tooth inside and a tooth outside facing away from the tooth inside. The distance between the tooth inside and the tooth outside reduces towards a foot portion of the chisel tooth, whereby the friction between the carrier body and the reinforcing steel and the concrete surrounding the reinforcing steel can be further reduced.

According to various embodiments, the chisel tooth can be pressed into a tooth receiver of the carrier body during a mounting movement, allowing a particularly simple process of mounting the chisel tooth which in particular may also be automated.

According to various embodiments, the chisel tooth has a contact face which faces away from chisel faces and which, in mounted state of the drill bit, is in engagement with a complementary counter contact face, whereby a unilateral axial support of the chisel tooth is achieved.

According to various embodiments, the chisel tooth has at least one form-fit element. The form-fit element is brought into form-fit engagement with a counter form-fit element of the carrier body such that the chisel tooth is fixed on the carrier body in the radial direction. Particularly precise positioning can be achieved if the chisel tooth has two form-fit elements and the carrier body has two counter form-fit elements. It is particularly advantageous for an even fixing in the axial direction if a form-fit element is arranged in the region of the front flank and in the region of the rear flank respectively.

According to various embodiments, the tooth receiver is advantageously cut into the drill bit by a material-removal process.

According to various embodiments, the drill bit has on its outer periphery a tangential control face which delimits the tooth receiver in the radial direction at least in portions. By means of the control face, a precise position determination of the chisel tooth can take place.

In order to create a good connection between the chisel tooth and the drill bit, the two components are soldered together according to various embodiments.

Various embodiments concern geometric configurations of the drill bit diameter.

Various embodiments provide a drill bit for percussion drilling or impact drilling use for cutting reinforcing steel in concrete, wherein the drill bit has a substantially hollow-cylindrical carrier body extending along a geometric drill bit axis, wherein the carrier body has at least one chisel tooth with a substantially radially extending first chisel edge, wherein the first chisel edge is arranged in a middle portion of the chisel tooth, in particular precisely centrally, in the circumferential direction, and the chisel tooth has a second chisel edge extending substantially tangentially to the circumferential direction of the drill bit.

In various embodiments, the second chisel edge is arranged in a middle portion of the chisel tooth, in particular precisely centrally, in the radial direction.

In various embodiments, the first chisel edge extends along a chisel edge line which runs through the geometric drill bit axis.

In various embodiments, the chisel faces directly adjoining the first chisel edge on both sides and/or portions of the second chisel edge each form an angle to a first chisel plane extending through the first chisel edge and the geometric drill bit axis, in a plane arranged orthogonally to the first chisel plane, of 30° to 45°, of 35° to 42.5°, or of 37.5° to 40°.

In various embodiments, the chisel faces directly adjoining the second chisel edge on both sides and/or portions of the first chisel edge each form an angle to a second chisel plane extending through the second chisel edge and parallel to the geometric drill bit axis, in a plane arranged orthogonally to the second chisel plane, of 50° to 75°, of 55° to 70°, or of 60° to 65°.

In various embodiments, the chisel tooth has a front flank extending substantially parallel to the first chisel plane and arranged at the front in the rotational direction of the drill bit, and a rear flank extending substantially parallel to the first chisel plane and arranged at the rear in the rotational direction of the drill bit; that the carrier body has a carrier end face which is arranged substantially perpendicularly to the geometric drill bit axis and relative to which the chisel tooth axially protrudes; that the chisel faces each have a flattening in the region of the front flank of the chisel tooth in the rotational direction and in the region of the rear flank of the chisel tooth in the rotational direction, in which flattenings the chisel faces are flattened so as to form a substantially continuous transition from the chisel faces to the carrier end face.

In various embodiments, in the region of the meeting of the first chisel edge and the second chisel edge, the chisel tooth has an axial overhang relative to the carrier end face of 1 mm to 4 mm, 1.5 mm to 3.5 mm, or 2 mm to 3 mm.

In various embodiments, the chisel tooth has a transverse extent in the running direction of the first chisel edge, that the transverse extent varies along the second chisel edge, and that the chisel tooth has its greatest transverse extent spaced from the front flank. In some embodiments, the chisel tooth has its greatest transverse extent between the first chisel edge and the front flank. In some embodiments, the greatest transverse extent has a first distance from the front flank and a second distance from the first chisel edge. In some embodiments, the ratio of the first distance to the second distance is from 1:1 to 1:8, 1:2 to 1:7, or 1:3 to 1:5.

In various embodiments, the chisel tooth protrudes radially inwardly and/or radially outwardly beyond the carrier body at least in portions in the region of the greatest transverse extent.

In various embodiments, starting from the greatest transverse extent, the transverse extent of the chisel tooth reduces along the second chisel edge towards the front flank and towards the rear flank. In some embodiments, the transverse extent in the region of the front flank and/or the transverse extent in the region of the rear flank corresponds to 98% to 85%, 96% to 80%, or 94% to 85% of the greatest transverse extent.

In various embodiments, the chisel tooth has a tooth inside facing in the radial direction of the geometric drill bit axis and a tooth outside facing away in the radial direction of the geometric drill bit axis, that the distance between the tooth inside and the tooth outside reduces in the axial direction starting from the first chisel edge towards a foot portion of the chisel tooth, or that the distance between the tooth inside and the tooth outside remains substantially constant in the axial direction starting from the first chisel edge towards a foot portion of the chisel tooth.

In various embodiments, during mounting of the drill bit, the chisel tooth can be pressed, in particular in the axial direction, into a tooth receiver of the carrier body.

In various embodiments, the chisel tooth has at least one contact face which faces away from the first chisel edge and the second chisel edge and which, in mounted state of the drill bit, is in engagement with a complementarily formed counter contact face of the carrier body. In some embodiments, the contact face is formed flat or that the contact face is formed convex. In some embodiments, the contact face is substantially semicircular.

In various embodiments, the chisel tooth has at least one form-fit element which is brought into engagement with a counter form-fit element of the carrier body such that the chisel tooth is held radially fixedly on the carrier body.

In various embodiments, the chisel tooth has two form-fit elements which are each brought into engagement with a counter form-fit element of the carrier body such that the chisel tooth is held radially fixedly on the carrier body. In some embodiments, a form-fit element is arranged in the region of the front flank and in the region of the rear flank of the chisel tooth respectively.

In various embodiments, the tooth receiver is cut into the drill bit by a material-removal process. In some embodiments, the tooth receiver is cut into the drill bit by milling. In some embodiments, the tooth receiver is cut into the drill bit in the radial and/or tangential direction, or that the tooth receiver is cut into the drill bit exclusively in the axial direction.

In various embodiments, the drill bit has on its outer periphery a tangential control face and that the control face delimits the tooth receiver in the radial direction at least in portions.

In various embodiments, the chisel tooth is soldered to the carrier body to produce the drill bit, in particular by means of silver solder and/or copper solder.

In various embodiments, the drill bit has a diameter of 10 mm to 60 mm, 12 mm to 50 mm, or 16 mm to 45 mm.

BRIEF DESCRIPTION OF THE DRAWINGS

Various aspects are explained in more detail below with reference to a drawing showing purely exemplary embodiments. In the drawing.

DETAILED DESCRIPTION

Figure 1:
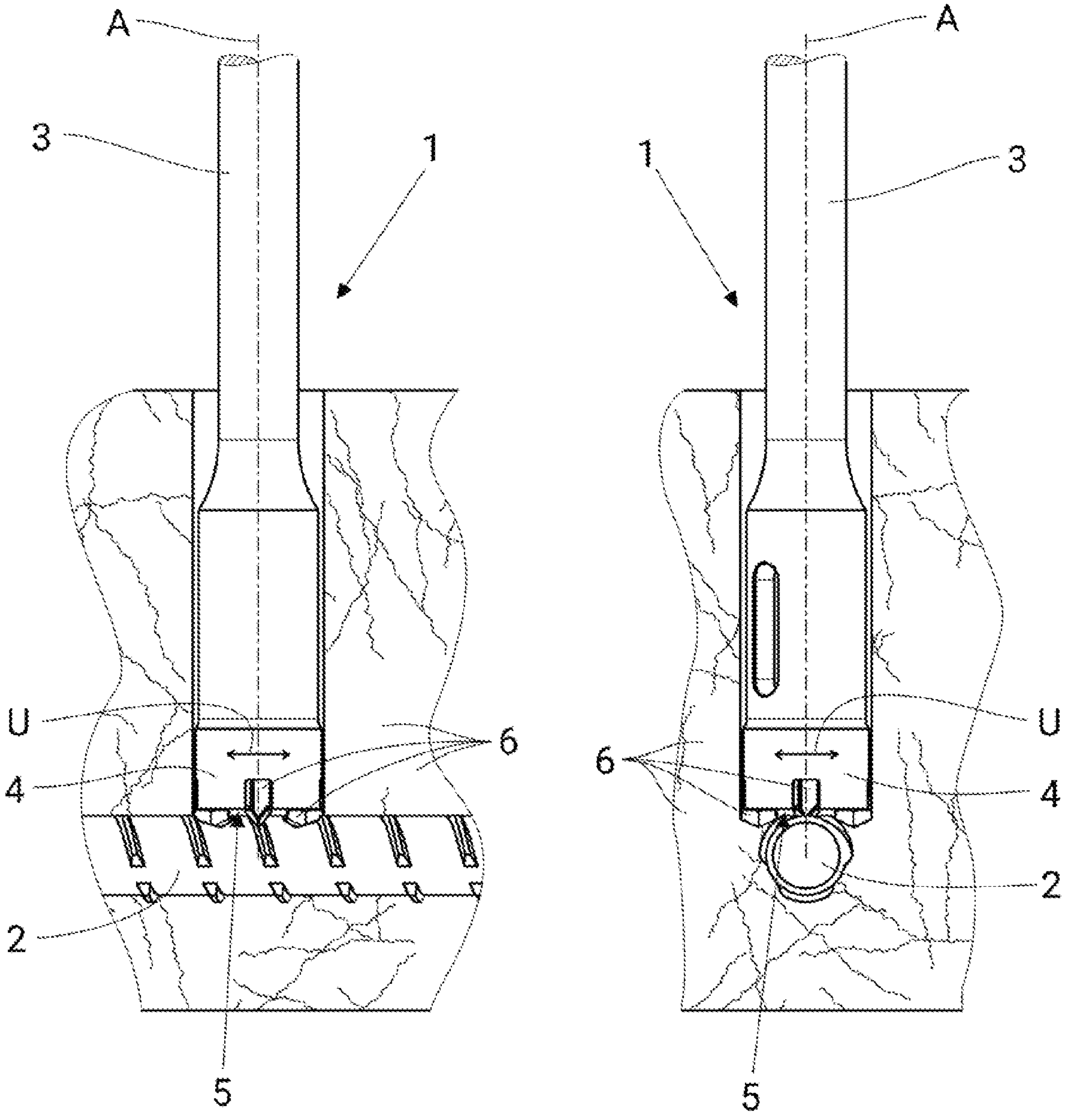
FIG. 1 shows a view of a drill bit from two sides.

The drawings show a drill bit 1 according to various embodiments for percussion drilling or impact use for cutting reinforcing steel 2 in concrete. During percussion drilling or impact drilling use of the drill bit 1, rotation speeds of 100 to 1500 revolutions per minute and impact counts of 1000 to 5000 per minute may be achieved.

The drill bit 1 has a shank portion 3 and a carrier body 4 formed on the shank portion 3. As the figures show, the carrier body 4 is substantially hollow-cylindrical. The shank portion 3 and the carrier body 4 need not necessarily be formed as one piece. Because of the force transfer from the shank portion 3 to the carrier body 4 however, an integral design of the carrier body 4 on the shank portion 3 can be preferred in some embodiments.

The drill bit 1 has a geometric drill bit axis A along which the hollow-cylindrical carrier body 4 extends in the axial direction. The term "axial" in this case refers to the geometric drill bit axis A. Similarly, the terms "radial" and "circumferential" here also refer to the geometric drill bit axis A.

At least one chisel tooth 6 is arranged on a radial end face 5 of the carrier body 4 in the circumferential direction U. In the embodiment shown in the figures, the carrier body 4 has four chisel teeth 6. It is however also possible to provide more or fewer than four chisel teeth 6.

Figure 3:
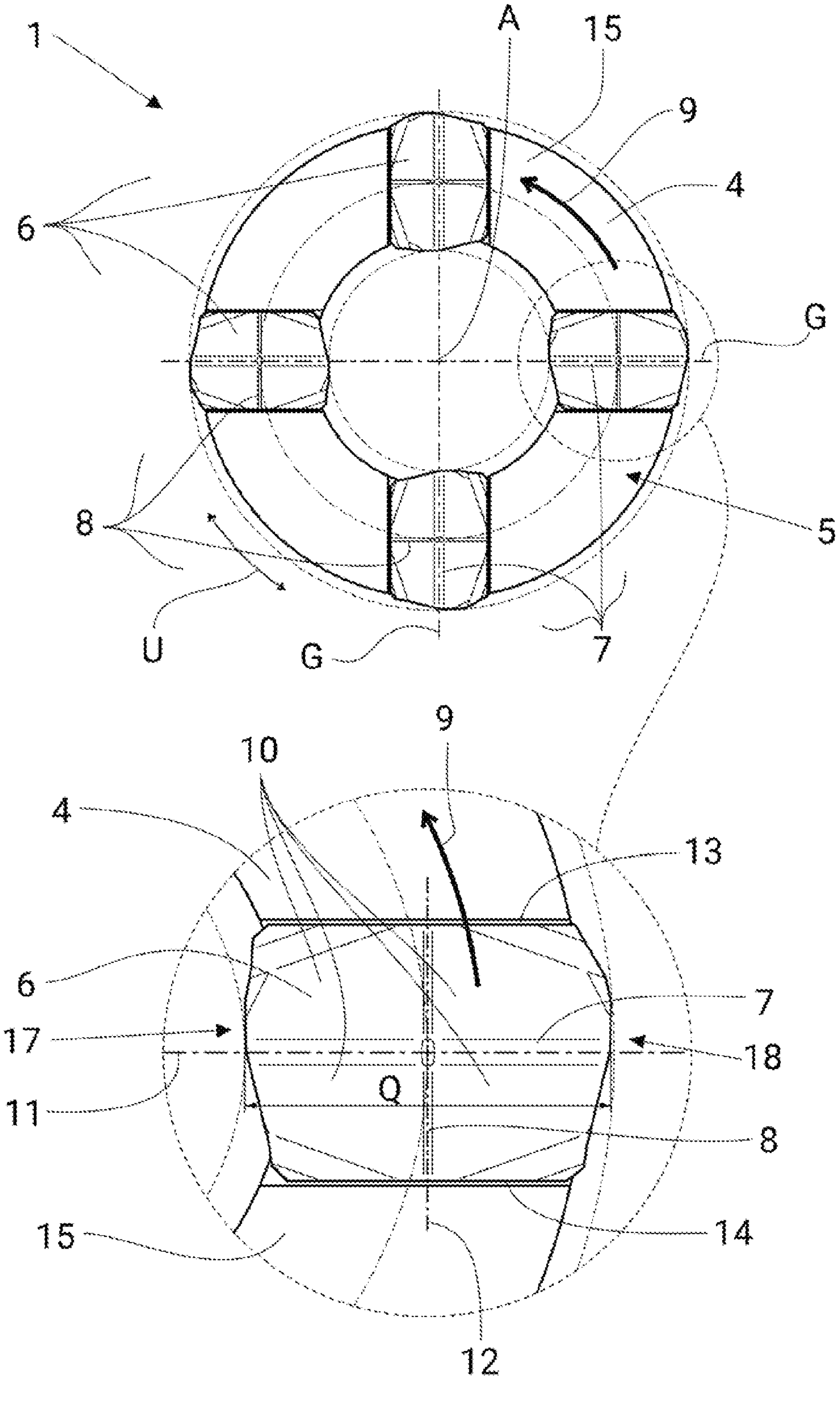
FIG. 3 shows a view of the carrier body from FIG. 1 from below with four chisel teeth and a detail view of a chisel tooth from below.

As shown in FIG. 3 for example, the chisel tooth 6 has a first chisel edge 7 extending substantially in the radial direction. The term "in the radial direction" in this case refers to the geometric drill bit axis A. Accordingly, the term "in the radial direction" refers to a state in which the chisel tooth 6 is fixed to the carrier body 4. The term "fixed" in the present case means axially and radially fixed, and comprises a connection by form fit, substance bonding and/or force fit between the chisel tooth 6 and the carrier body 4. It is also possible that the carrier body 4 and the chisel tooth 6 are formed integrally with one another.

The first chisel edge 7, as shown in the figures, is arranged in the middle of the chisel tooth 6 in the circumferential direction U, whereby an even geometry can be achieved in the circumferential direction U, as explained in more detail below.

It is essential that the first chisel edge 7 is arranged in a middle portion of the chisel tooth 6, in particular precisely centrally, in the circumferential direction U, and that the chisel tooth 6 has a second chisel edge 8 extending substantially tangentially to the circumferential direction U of the drill bit 1. The phrase "in a middle portion of the chisel tooth", in this case relative to the circumferential direction U, means the middle third or fifth of the chisel tooth 6. The chisel tooth 6 thus has a total of two chisel edges 7, 8 which, on percussive or impact use for cutting reinforcing steel 2 in concrete, come into contact with the reinforcing steel 2 and chisel through the reinforcing steel 2. It has been found that a central arrangement of the first chisel edge 7 in combination with a second chisel edge 8 achieves a particularly even and efficient cutting of the reinforcing steel 2 on percussive or impact use. Because two chisel edges 7, 8 in total are formed, the first chisel edge 7 and the second chisel edge 8 each consist of two portions not arranged co-linearly with one another. In this way, at the intersection of the two chisel edges 7, 8, a chisel tip is formed which simplifies penetration into the reinforcing steel 2.

The cutting of the reinforcing steel 2 may be further improved if the second chisel edge 8 is arranged in a middle portion of the chisel tooth 6, in particular precisely centrally, in the radial direction. With respect to the term "in a middle portion", reference may be made to the above definition. It has been found that on percussive or impact use, a central arrangement of the first chisel edge 7 and second chisel edge 9 can reduce forces generated against the rotational direction 9 of the drill bit 1, whereby a particularly even and efficient cutting of the reinforcing steel 2 is possible.

As shown in FIG. 3, the first chisel edge 7 defines a chisel edge line G which runs through the geometric drill bit axis A. The first chisel edge 7 is then arranged radially relative to the geometric drill bit axis A. Because of this arrangement, on percussive or impact use, the first chisel edge 7 generates substantially no force against the rotational direction 9 of the drill bit 1, whereby cutting can take place particularly efficiently.

As shown in the figures, the first chisel edge 7 and the second chisel edge 8 intersect one another and are formed perpendicularly to one another.

A high efficiency is necessary for rapid and even cutting of the reinforcing steel 2. The efficiency may be increased if the chisel faces 10 directly adjoining the first chisel edge 7 on both sides and/or portions of the second chisel edge 8 each form an angle to a first chisel plane 11 extending through the first chisel edge 7 and the geometric drill bit axis A, in a plane arranged orthogonally to the first chisel plane 11, of 30° to 45°, 35° to 42.5°, or 37.5° to 40°. The angle is here measured in a plane arranged orthogonally to the first chisel plane 11. Because of the design of the chisel tooth 6 with the first chisel edge 7 and second chisel edge 8, there are four chisel faces 10 in total.

Figure 2:
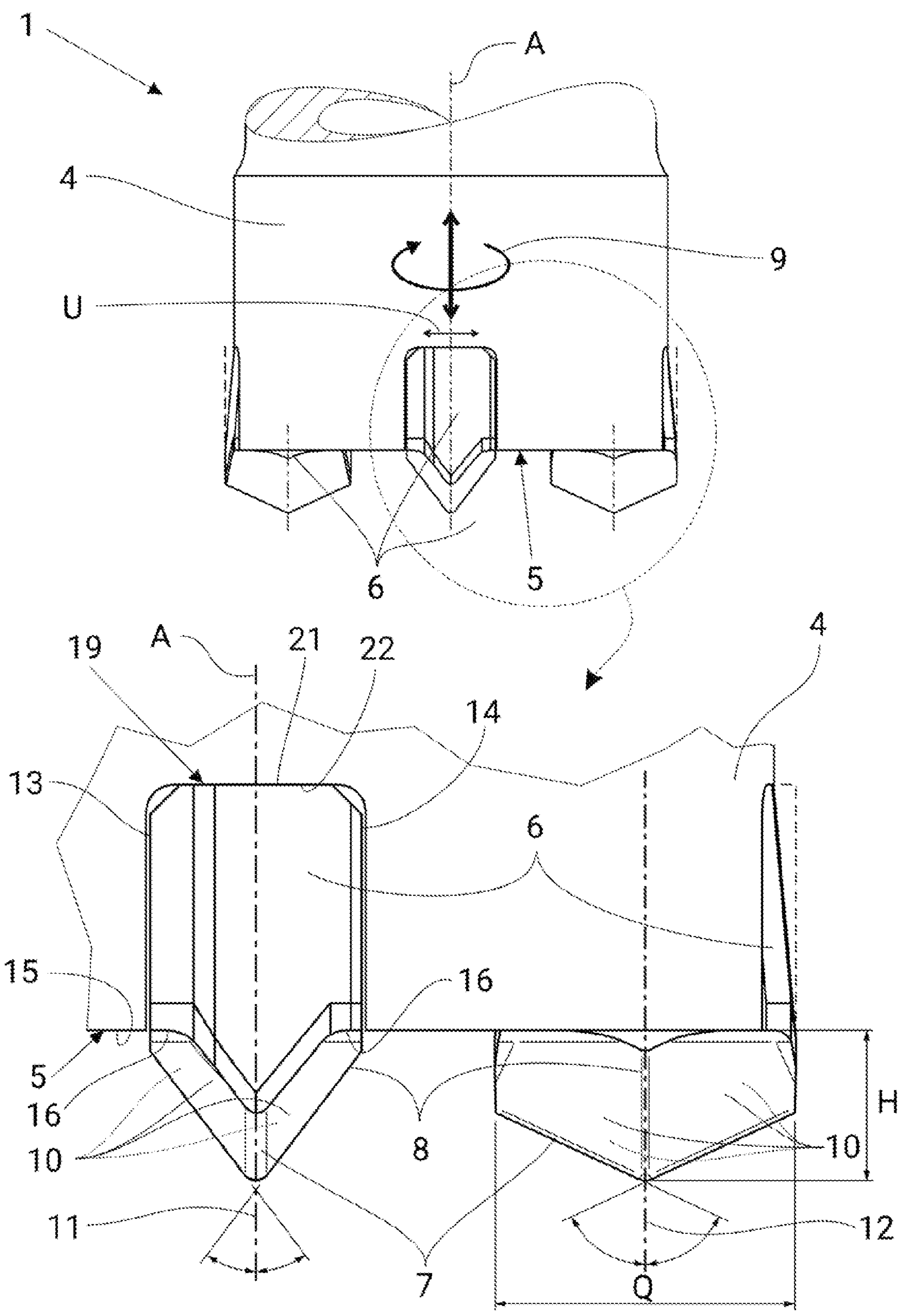
FIG. 2 shows a detail view of the carrier body of the drill bit from FIG. 1 and a partly cut-away view of the carrier body from FIG. 1 with two chisel teeth.

It is particularly advantageous here if the angles between the chisel faces 10 and the first chisel plane 11 are identical, as shown in FIG. 2. Thus the forces generated on percussive or impact use by the first chisel edge 7 in the rotational direction 9 of the drill bit 1 are identical to the forces generated by the first chisel edge 7 against the rotational direction 9. The forces in and against the rotational direction 9 of the drill bit 1 thus balance each other out, whereby cutting of the reinforcing steel 2 can take place particularly evenly and efficiently.

Furthermore, it can be provided that the chisel faces 10 directly adjoining the second chisel edge 8 on both sides and/or portions of the first chisel edge 7 each form an angle to a second chisel plane 12 extending through the second chisel edge 8 and parallel to the geometric drill bit axis A, in a plane arranged orthogonally to the second chisel plane 12, of 50° to 75°, 55° to 70°, or 60° to 65°. It has been found that with the above-mentioned angles between the chisel faces 10 and the first chisel plane 11 and the second chisel plane 12, particularly good results can be achieved when cutting reinforcing steel 2.

Here, the first chisel plane 11 intersects the second chisel plane 12 at a right angle, as shown in FIG. 3.

In the embodiment shown in the figures, it is provided that the chisel tooth 6 has a front flank 13 extending substantially parallel to the first chisel plane 11 and arranged at the front in the rotational direction 9 of the drill bit 1, and a rear flank 14 extending substantially parallel to the first chisel plane 11 and arranged at the rear in the rotational direction 9 of the drill bit 1; that the carrier body 4 has a carrier end face 15 which is arranged substantially perpendicularly to the geometric drill bit axis A and relative to which the chisel tooth 6 axially protrudes; that the chisel faces 10 each have a flattening 16 in the region of the front flank 13 of the chisel tooth 6 in the rotational direction 9 and in the region of the rear flank 14 of the chisel tooth 6 in the rotational direction 9, in which flattenings the chisel faces 10 are flattened so as to form a substantially continuous transition from the chisel faces 10 to the carrier end face 15.

This may prevent a snagging of the chisel tooth 6 on a rotary movement of the drill bit 1 when cutting through the reinforcing steel 2, for example with a protruding burr. Then material can be conveyed over the chisel faces 10 in a simple fashion, without hindering the rotary movement of the drill bit 1.

As shown in FIG. 2, here it can be provided that the front flank 13 and the rear flank 14 do not substantially protrude axially over the carrier end face 15 in the direction toward s the first chisel edge 7.

Because of the arrangement of the front flank 13 and rear flank 14 parallel to the first chisel plane 11, the length of the chisel tooth 6 is substantially constant. The term "length of the chisel tooth" in the present case refers to the direction along the second chisel edge 8 and transversely to the first chisel edge 7.

The chisel tooth 6 may be formed particularly stable if, in the region of the meeting of the first chisel edge 7 and the second chisel edge 8, the chisel tooth 6 has an axial overhang H relative to the carrier end face 15 of 1 mm to 4 mm, 1.5 mm to 3.5 mm, or 2 mm to 3 mm. The phrase "in the region of the meeting" in the present case means the intersection between the first chisel edge 7 and the second chisel edge 8. It has been found that with corresponding overhangs H, a particularly efficient cutting of reinforcing steel 2 in concrete can be achieved.

As shown in the figures, the overhang H is covered only by the chisel faces 10. The chisel faces 10 form a constant transition to the carrier end face 15 and during not terminate beyond this in the radial direction or also do not impinge into the carrier end face 15 in the axial direction. Alternatively however, it is also conceivable that the overhang H is configured such that the chisel faces 10 do not form a constant transition to the carrier end face 15.

In order to guarantee an even cutting of the reinforcing steel 2, it is important to prevent damage to the chisel tooth 6 and thus improve the service life. The service life of the chisel tooth 6 may be extended if the chisel tooth 6 has a transverse extent Q in the direction of the first chisel edge 7, if the transverse extent Q is variable along the second chisel edge 8, and if the chisel tooth 6 has its greatest transverse extent Q spaced from the front flank 13. In this way, the front flank 13 carries less load. At the same time, damage to the chisel tooth 6 in the region of the maximum transverse extent Q is prevented.

The probability of damage to the chisel tooth 6 may be further reduced if the chisel tooth 6 has its greatest transverse extent Q between the first chisel edge 7 and the front flank 13. In the embodiment shown in the figures, it is provided that the greatest transverse extent Q has a first distance from the front flank 13 and a second distance from the first chisel edge 7, and that the ratio of the first distance to the second distance is from 1:1 to 1:8, 1:2 to 1:7, or 1:3 to 1:5.

Furthermore, it can be provided that the chisel tooth 6 protrudes radially inwardly and/or radially outwardly beyond the carrier body 4, at least in portions, in the region of the greatest transverse extent Q. In this way, the friction between the drill bit 1 and the reinforcing steel 2 and the concrete surrounding the reinforcing steel 2 can be reduced.

Here, it is particularly advantageous if the front flank 13 and/or the rear flank 14 do not protrude beyond the carrier body 2 in the radial direction, as shown in FIG. 3. This ensures an even transition in the radial direction starting from the carrier body 4 to the chisel tooth 6, whereby damage to the chisel tooth 6 may be further prevented. It is however also possible that the front flank 13 and/or the rear flank 14 protrude beyond the carrier body 4 on one or both sides in the radial direction.

The transverse extent Q may reduce along the second chisel edge 8 towards the front flank 13 and towards the rear flank 14 in various ways. Here, the transverse extent Q in the region of the front flank 13 and/or the transverse extent Q in the region of the rear flank 14 corresponds to 98% to 85%, of the greatest transverse extent Q, 96% to 80%, or 94% to 85%. The reduction in transverse extent Q may be identical or vary in amount on the two sides of the first chisel edge 7.

As FIG. 3 shows, it can be provided that, starting from the greatest transverse extent Q, the transverse extent Q of the chisel tooth 6 reduces along the second chisel edge 8 towards the front flank 13 and the rear flank 14, whereby the friction during operation of the drill bit 1 may be further reduced. Here, the transverse extent Q in the region of the front flank 13 and/or the transverse extent Q in the region of the rear flank 14 corresponds to 98% to 85%, 96% to 80%, or 94% to 85% of the greatest transverse extent Q.

In the embodiment shown in solid lines in FIG. 2, it is provided that the chisel tooth 6 has a tooth inside 17 facing in the radial direction of the geometric drill bit axis A, and a tooth outside 18 facing away in the radial direction of the geometric drill bit axis A, and that the distance between the tooth inside 17 and the tooth outside 18 reduces in the axial direction starting from the first chisel edge 7 towards a foot side 19 of the chisel tooth 6. However, in the second embodiment illustrated in dotted lines in FIG. 2, it is provided that the distance between the tooth inside 17 and the tooth outside 18, starting from the first chisel edge 7, remains substantially constant in the axial direction towards a foot side 19 of the chisel tooth 7 facing away from the chisel edge.

The drill bit 1 may be produced particularly easily if, during mounting of the drill bit 1, the chisel tooth 6 can be pressed, in particular in the axial direction, into a tooth receiver 20 of the carrier body 4 in a mounting movement. In this way, mounting of the drill bit 1 in the tooth receiver 20 can be carried out with particularly simple movements if the mounting is based substantially on the mounting of the chisel tooth 6. Such a movement can also easily be performed automatically. Alternatively or additionally, it is conceivable that the mounting movement takes place in the radial direction. In the embodiment in FIG. 4*a*) and in the embodiment shown in FIG. 4*b*), it is possible that the mounting movement takes place in the radial and/or in the axial direction.

It is furthermore provided that the chisel tooth 6 has at least one contact face 21 which faces away from the first chisel edge 7 and the second chisel edge 8 and which, in mounted state of the drill bit 1, is in engagement with a complementarily formed counter contact face 22 of the carrier body 4. As shown in the figures, the contact face 21 is arranged on the foot side 19 of the chisel tooth 6. In this way, an axially fixed connection is created between the chisel tooth 6 and the carrier body 4 in the direction of the shank portion 3. The counter contact face 22 thus delimits the tooth receiver 20 on one side in the axial direction. In the embodiments shown in FIGS. 4*a*), 4*b*) and 4*c*), it is provided that the contact face 21 is formed flat.

Figure 4:
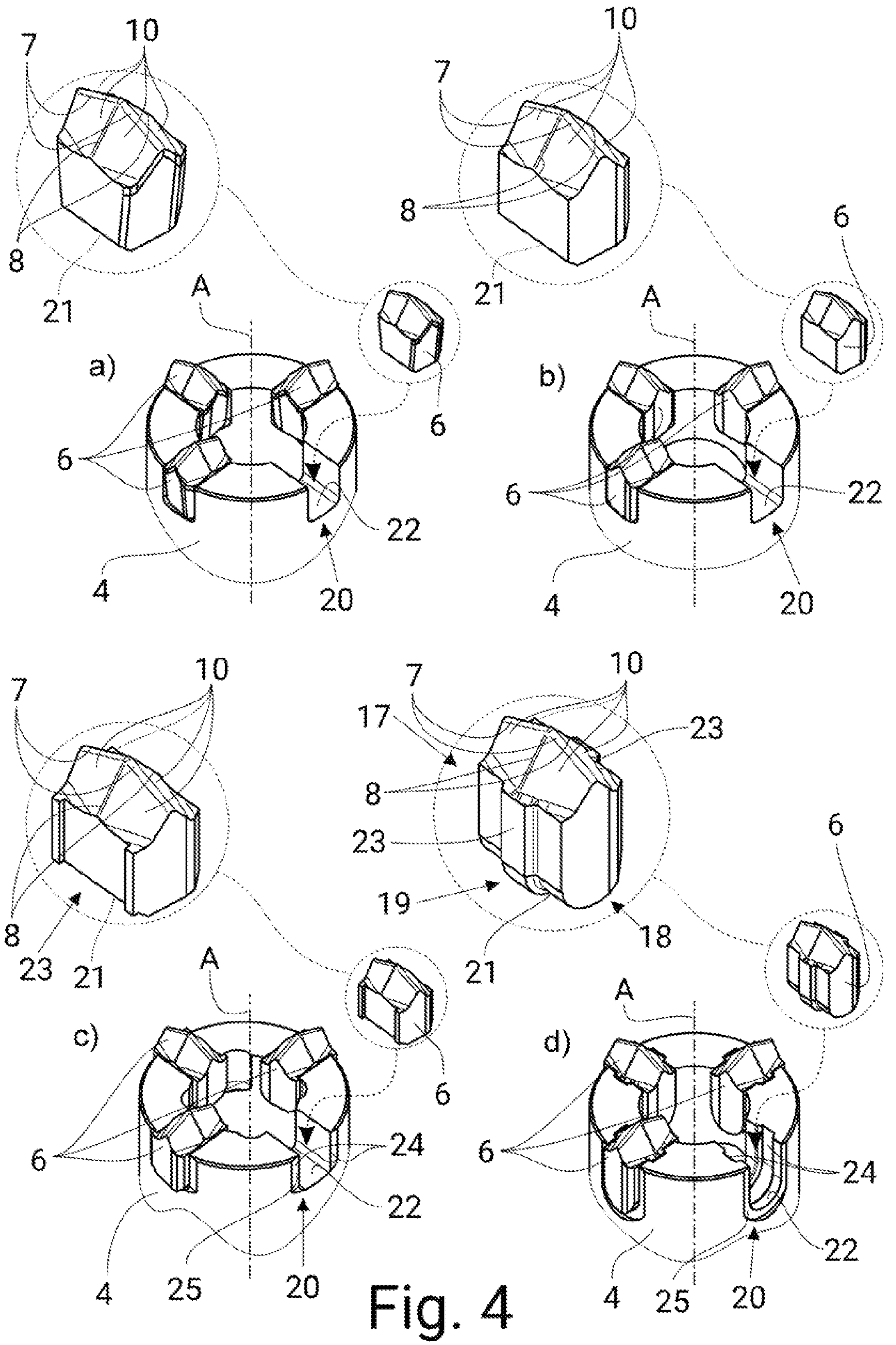
FIG. 4 shows a perspective view of the carrier body with four chisel teeth, and a detail view of a chisel tooth in a) a first embodiment, b) a second embodiment, c) a third embodiment, and d) a fourth embodiment.

The contact face 21 may also comprise multiple part faces as shown in FIG. 4*d*).

In the embodiment shown in FIG. 4*d*), the contact face 21 is however formed convex. It is particularly advantageous if the contact face 21 is substantially semicircular. The counter contact face 22 is then formed correspondingly concave.

In the embodiment shown in FIG. 4*c*), and in the embodiment shown in FIG. 4*d*), in each case it can be provided that the chisel tooth 6 has at least one form-fit element 23 which is brought into engagement with a counter form-fit element 24 of the carrier body 4 such that the chisel tooth 6 is held radially fixedly on the carrier body 4. It is then possible that by introducing the chisel tooth 6 into the tooth receiver 20, a radially fixed connection is created between the chisel tooth 6 and the carrier body 4. The chisel tooth 6 can then be positioned relative to the carrier body 4 particularly easily.

In the embodiment shown in FIG. 4*c*), the chisel tooth 6 has precisely one form-fit element 23 in the form of a groove on the rear flank 14. The counter form-fit element 24 is formed by a complementary protrusion in the carrier body 4.

In contrast, in the embodiment shown in FIG. 4*d*), the chisel tooth 6 has two form-fit elements 23 which are each brought into engagement with a counter form-fit element 24 of the carrier body 4 such that the chisel tooth 6 is held radially fixedly on the carrier body 4. As furthermore shown in FIG. 4*d*), it can be provided that a form-fit element 23 is arranged in the region of the front flank 13 and in the region of the rear flank 14 of the chisel tooth 6 respectively. In this way, an even loading of the chisel tooth 6 in the radial direction can be ensured.

For a particularly simple production of the drill bit 1, it can be provided that the tooth receiver 20 is cut into the drill bit 1 by a material-removal process. A material-removal process is particularly cheap and easy to implement. Here, the tooth receiver 20 can be cut into the drill bit 1 by milling, allowing machining which can be automated to a great extent. It is here possible that the tooth receiver 20 is cut into the drill bit 1 substantially in the radial and/or in the axial direction.

Thus in the embodiment shown in FIGS. 4*a*), 4*b*) and 4*c*), it is provided that the tooth receiver 20 is cut substantially by milling of the carrier body 4 in the radial direction. In the embodiment shown in FIG. 4*d*), it is however provided that the tooth receiver 20 is cut substantially by milling the carrier body 4 in the axial direction.

As shown in the figures, tooth receiver 20 at least in portions is formed complementary to the chisel tooth 6, whereby a particularly precise positioning of the chisel tooth 6 relative to the carrier body 4 is achieved.

Furthermore, in the embodiment shown in FIG. 4*c*), and in the embodiment shown in FIG. 4*d*), it is provided that the drill bit 1 has on its outer periphery a tangential control face 25 and that the control face 25 delimits the tooth receiver 20 in the radial direction at least in portions. The control face 25 here serves as a reference for determining the orientation of the tooth receiver 20 and/or chisel tooth 6.

Furthermore, it can be provided that the chisel tooth 6 is soldered to the carrier body 4 to produce the drill bit 1, in particular by means of silver solder and/or copper solder. Thus in a simple and low-cost fashion, a substance-bonded engagement can be created between the chisel tooth 6 and the drill bit 1.

It is particularly advantageous if the drill bit 1 has a diameter of 10 mm to 60 mm, 12 mm to 50 mm, or 16 mm to 45 mm.

It is then possible to adapt the number of teeth to the diameter. Here, the number of teeth can be between four and six. It is also possible however to provide a different number of teeth.

LIST OF REFERENCE SIGNS

1 Drill bit
2 Reinforcing steel
3 Shank portion
4 Carrier body
A Geometric drill bit axis
U Circumferential direction
5 End face
6 Chisel tooth
7 First chisel edge
8 Second chisel edge
9 Rotational direction
G Chisel edge line
10 Chisel faces
11 First chisel plane
12 Second chisel plane
13 Front flank
14 Rear flank
15 Carrier end face
H Overhang
Q Transverse extent
17 Tooth inside
18 Tooth outside
19 Foot side
20 Tooth receiver
21 Contact face
22 Counter contact face
23 Form-fit element
24 Counter form-fit element
16 Flattening

The invention claimed is:

1. A drill bit for percussion drilling or impact drilling use for cutting reinforcing steel in concrete, wherein the drill bit comprises a substantially hollow-cylindrical carrier body extending along a geometric drill bit axis, wherein the carrier body comprises at least one chisel tooth with a substantially radially extending first chisel edge, wherein the first chisel edge is arranged in a middle portion of the chisel tooth in the circumferential direction, and the chisel tooth comprises a second chisel edge extending substantially tangentially to the circumferential direction of the drill bit, wherein the chisel tooth comprises at least one form-fit element which is brought into engagement with a counter form-fit element of the carrier body such that the chisel tooth is held radially fixedly on the carrier body.

2. The drill bit as claimed in claim 1, wherein the second chisel edge is arranged in a middle portion of the chisel tooth in the radial direction.

3. The drill bit as claimed in claim 1, wherein the first chisel edge extends along a chisel edge line which runs through the geometric drill bit axis.

4. The drill bit as claimed in claim 1, wherein the chisel faces directly adjoining the first chisel edge on both sides and/or portions of the second chisel edge each form an angle to a first chisel plane extending through the first chisel edge and the geometric drill bit axis, in a plane arranged orthogonally to the first chisel plane of 30° to 45°.

5. The drill bit as claimed in claim 1, wherein the chisel faces directly adjoining the second chisel edge on both sides and/or portions of the first chisel edge each form an angle to a second chisel plane extending through the second chisel edge and parallel to the geometric drill bit axis, in a plane arranged orthogonally to the second chisel plane, of 50° to 75°.

6. The drill bit as claimed in claim 1, wherein the chisel tooth comprises a front flank extending substantially parallel to the first chisel plane and arranged at the front in the rotational direction of the drill bit, and a rear flank extending substantially parallel to the first chisel plane and arranged at the rear in the rotational direction of the drill bit; that the carrier body comprises a carrier end face which is arranged substantially perpendicularly to the geometric drill bit axis and relative to which the chisel tooth axially protrudes; that the chisel faces each have a flattening in the region of the front flank of the chisel tooth in the rotational direction and in the region of the rear flank of the chisel tooth in the rotational direction, in which flattenings the chisel faces are flattened so as to form a substantially continuous transition from the chisel faces to the carrier end face.

7. The drill bit as claimed in claim 1, wherein in the region of the meeting of the first chisel edge and the second chisel edge, the chisel tooth comprises an axial overhang relative to the carrier end face of 1 mm to 4 mm.

8. The drill bit as claimed in claim 1, wherein the chisel tooth comprises a transverse extent in the running direction of the first chisel edge, that the transverse extent varies along the second chisel edge, and that the chisel tooth has its greatest transverse extent spaced from the front flank.

9. The drill bit as claimed in claim 1, wherein the chisel tooth protrudes radially inwardly and/or radially outwardly beyond the carrier body at least in portions in the region of the greatest transverse extent.

10. The drill bit as claimed in claim 1, wherein starting from the greatest transverse extent, the transverse extent of the chisel tooth reduces along the second chisel edge towards the front flank and towards the rear flank.

11. The drill bit as claimed in claim 1, wherein the chisel tooth comprises a tooth inside facing in the radial direction of the geometric drill bit axis and a tooth outside facing away in the radial direction of the geometric drill bit axis, that the distance between the tooth inside and the tooth outside reduces in the axial direction starting from the first chisel edge towards a foot portion of the chisel tooth, or that the distance between the tooth inside and the tooth outside remains substantially constant in the axial direction starting from the first chisel edge towards a foot portion of the chisel tooth.

12. The drill bit as claimed in claim 1, wherein during mounting of the drill bit, the chisel tooth is configured to be pressed into a tooth receiver of the carrier body.

13. The drill bit as claimed in claim 1, wherein the chisel tooth has at least one contact face which faces away from the first chisel edge and the second chisel edge and which, in mounted state of the drill bit, is in engagement with a complementarily formed counter contact face of the carrier body.

14. The drill bit as claimed in claim 1, wherein the chisel tooth comprises two form-fit elements which are each brought into engagement with a counter form-fit element of the carrier body such that the chisel tooth is held radially fixedly on the carrier body.

15. The drill bit as claimed in claim 1, wherein the tooth receiver is cut into the drill bit by a material-removal process or that the tooth receiver is cut into the drill bit exclusively in the axial direction.

16. The drill bit as claimed in claim 1, wherein the drill bit comprises on its outer periphery a tangential control face and that the control face delimits the tooth receiver in the radial direction at least in portions.

17. The drill bit as claimed in claim 1, wherein the chisel tooth is soldered to the carrier body to produce the drill bit.

18. The drill bit as claimed in claim 1, wherein the drill bit comprises a diameter of 10 mm to 60 mm.

19. The drill bit as claimed in claim 1, wherein the chisel tooth comprises a transverse extent in the running direction of the first chisel edge, that the transverse extent varies along the second chisel edge, and that the chisel tooth has its greatest transverse extent spaced from the front flank, wherein the chisel tooth has its greatest transverse extent between the first chisel edge and the front flank, and wherein the greatest transverse extent has a first distance from the front flank and a second distance from the first chisel edge, and wherein the ratio of the first distance to the second distance is from 1:1 to 1:8.

* * * * *